(12) United States Patent
Lee et al.

(10) Patent No.: US 12,269,741 B2
(45) Date of Patent: Apr. 8, 2025

(54) REFORMING SYSTEM AND METHOD

(71) Applicants: Bong Ju Lee, Daejeon (KR); Hag Joo Lee, Seoul (KR)

(72) Inventors: Bong Ju Lee, Daejeon (KR); Hag Joo Lee, Seoul (KR)

( * ) Notice: Subject to any disclaimer, the term of this patent is extended or adjusted under 35 U.S.C. 154(b) by 860 days.

(21) Appl. No.: 17/467,414

(22) Filed: Sep. 6, 2021

(65) Prior Publication Data

US 2023/0070320 A1 Mar. 9, 2023

(51) Int. Cl.
| | | |
|---|---|---|
| C01B 3/34 | (2006.01) | |
| C01B 3/12 | (2006.01) | |
| C10B 53/07 | (2006.01) | |

(52) U.S. Cl.
CPC .............. *C01B 3/342* (2013.01); *C01B 3/12* (2013.01); *C10B 53/07* (2013.01); *C01B 2203/0233* (2013.01); *C01B 2203/049* (2013.01); *C01B 2203/0495* (2013.01); *C01B 2203/0861* (2013.01); *C01B 2203/0883* (2013.01); *C01B 2203/142* (2013.01); *C01B 2203/148* (2013.01); *C01B 2203/1623* (2013.01)

(58) Field of Classification Search
CPC ... C01B 3/342; C01B 3/12; C01B 2203/0233; C01B 2203/049; C01B 2203/0495; C01B 2203/0861; C01B 2203/0883; C01B 2203/142; C01B 2203/148; C01B 2203/1623; C01B 2203/0283; C01B 2203/0405; C01B 3/50; C01B 2203/043; C01B 2203/1223; C01B 2203/1235; C01B 2203/1241; C01B 2203/141; C01B 3/38; C10B 53/07; C10B 53/00; C10K 3/001

See application file for complete search history.

(56) References Cited

U.S. PATENT DOCUMENTS

| | | | |
|---|---|---|---|
| 7,407,634 B2 | 8/2008 | Rabinovich et al. | |
| 2012/0017511 A1* | 1/2012 | Fischer | C01B 3/56 |
| | | | 48/197 R |
| 2016/0121296 A1* | 5/2016 | Hong | B01J 19/088 |
| | | | 422/186.29 |

FOREIGN PATENT DOCUMENTS

| | | |
|---|---|---|
| KR | 20110013999 A | 2/2011 |
| KR | 101277123 B1 | 6/2013 |
| KR | 10-1594188 B1 | 2/2016 |
| KR | 20180116952 A | 10/2018 |
| KR | 10-2135299 B1 | 7/2020 |

* cited by examiner

*Primary Examiner* — Wayne A Langel
*Assistant Examiner* — Syed T Iqbal
(74) *Attorney, Agent, or Firm* — Maschoff Brennan (57) ABSTRACT

A reforming method may include: reforming a hydrocarbon with steam plasma to generate a first synthetic gas, which includes hydrogen and carbon dioxide, from the hydrocarbon; cooling the first synthetic gas to a predetermined temperature, removing water vapor included in the first synthetic gas, and separating hydrogen from the first synthetic gas; reforming the first synthetic gas, from which hydrogen is separated, and a hydrocarbon with steam plasma to generate hydrogen, and generating a second synthetic gas in which carbon dioxide is decreased; and cooling the second synthetic gas to a predetermined temperature, removing water vapor included in the second synthetic gas, and separating hydrogen from the second synthetic gas.

7 Claims, 5 Drawing Sheets

REFORMING SYSTEM AND METHOD

BACKGROUND

1. Field of the Invention

The present invention relates to a reforming system and method, and more particularly, to a reforming system and method of reforming a hydrocarbon to obtain hydrogen.

2. Discussion of Related Art

Hydrocarbons such as natural gas, petroleum gas, and the like are reformed in the presence of a reforming material (such as carbon dioxide, water vapor, oxygen, and the like) and a catalyst to be converted to hydrogen, carbon monoxide, and the like.

Such a reaction may be used for various purposes, for example, for hydrogen supply in a fuel cell, which is considered to be one of energy source alternatives to fossil fuels.

Here, a representative method of preparing hydrogen known in the art includes: steam reforming naphtha, which is generated in a process of refining natural gas or crude oil, to produce hydrogen.

These methods are commercialized methods of preparing hydrogen and well known in the art, but have a drawback in that both reactants such as natural gas or naphtha are fossil fuels, and a large amount of carbon dioxide is generated during a process of the steam reforming reaction.

Carbon dioxide generated during the use of fossil fuels is known as a greenhouse gas that causes global warming. Therefore, various European countries have imposed a high carbon tax on fossil fuels, and seriously limited the use of fossil fuels by introducing regulations on total carbon emissions, carbon emissions trading schemes, or the like.

Therefore, many countries have made lots of effort in research and development of a method of producing hydrogen for fuel cells from a new renewable energy source.

Meanwhile, Korean Patent No. 10-1594188 (Feb. 15, 2016) discloses a method of preparing a synthetic gas.

However, the patent has focuses on energy efficiency through daytime or nighttime operations and has limitations in lowering the emission of a large amount of carbon dioxide produced during hydrogen production.

SUMMARY OF THE INVENTION

The present invention is designed to solve the problems of the related art, and therefore it is an object of the present invention to provide a reforming system and method capable of improving hydrogen yield efficiency and lowering the emission of carbon dioxide as well.

The technical objects to be achieved by the present invention are not limited to the aforementioned technical objects, and other objects which are not mentioned above will be clearly understood from the following detailed description by those skilled in the art to which the present invention belongs.

According to an aspect of the present invention, there is provided a reforming method of reforming a hydrocarbon to obtain hydrogen, which includes: reforming a hydrocarbon with steam plasma to generate a first synthetic gas, which includes hydrogen and carbon dioxide, from the hydrocarbon; cooling the first synthetic gas to a predetermined temperature, removing water vapor included in the first synthetic gas, and separating hydrogen from the first synthetic gas; reforming the first synthetic gas, from which hydrogen is separated, and the hydrocarbon with steam plasma to generate hydrogen, and generating a second synthetic gas in which carbon dioxide is decreased; and cooling the second synthetic gas to a predetermined temperature, removing water vapor included in the second synthetic gas, and separating hydrogen from the second synthetic gas.

BRIEF DESCRIPTION OF THE DRAWINGS

The above and other objects, features and advantages of the present invention will become more apparent to those of ordinary skill in the art by describing in detail exemplary embodiments thereof with reference to the attached drawings, in which.

DETAILED DESCRIPTION OF EXEMPLARY EMBODIMENTS

Hereinafter, specific embodiments of the present invention will be described in detail with reference to the accompanying drawings. However, it should be understood that the spirit and scope of the present invention is not limited to embodiments presented hereinbelow, and those skilled in the art who understand the spirit of the present invention may easily propose other regressive inventions or other embodiments included in the scope of the inventive concept by adding, changing, and deleting other elements within the scope of the inventive concept and these will also fall within the spirit of the inventive concept.

A reforming method according to one embodiment of the present invention is directed to a reforming method of reforming a hydrocarbon to obtain hydrogen, which includes: reforming a hydrocarbon with steam plasma to generate a first synthetic gas, which includes hydrogen and carbon dioxide, from the hydrocarbon; cooling the first synthetic gas to a predetermined temperature, removing water vapor included in the first synthetic gas, and separating hydrogen from the first synthetic gas; reforming the first synthetic gas, from which hydrogen is separated, and the hydrocarbon with steam plasma to generate hydrogen, and generating a second synthetic gas in which carbon dioxide is decreased; and cooling the second synthetic gas to a predetermined temperature, removing water vapor included in the second synthetic gas, and separating hydrogen from the second synthetic gas.

The hydrocarbon may include any one or a mixed gas of two or more selected from methane, LPG, methanol, and naphtha.

Also, the reforming reaction in the generating of the first synthetic gas may be represented by the following Expressions 1 and 2, and the reforming reaction in the generating of the second synthetic gas may be represented by the following Expressions 3 and 4.

Expression 1: $CH_4+H_2O \rightarrow CO+3H_2$
Expression 2: $CO+H_2O \rightarrow H_2+CO_2$
Expression 3: $CH_4+1.5\ CO_2 \rightarrow 2C+0.5\ CO+2\ H_2O$
Expression 4: $0.5\ CO+H_2O \rightarrow 0.5H_2+0.5\ CO_2+0.5H_2O$ A reforming system implementing the reforming method according to one embodiment of the present invention includes a reforming unit configured to reform a hydrocarbon with steam plasma to generate a first synthetic gas, which includes hydrogen and carbon dioxide, from the hydrocarbon; and a post-processing unit configured to cool the first synthetic gas to a predetermined temperature, remove water vapor included in the first synthetic gas, and separate hydrogen from the first synthetic gas, wherein the reforming unit may reform the first synthetic gas, from which hydrogen is separated, and the hydrocarbon with steam plasma to generate hydrogen, and then generate a second synthetic gas in which carbon dioxide is decreased, and the post-processing unit may cool the second synthetic gas to a predetermined temperature, remove water vapor included in the second synthetic gas, and then separate hydrogen from the second synthetic gas.

In addition, the reforming reaction for generating the first synthetic gas in the reforming unit may be represented by the following Expressions 1 and 2, and the reforming reaction for generating the second synthetic gas in the reforming unit may be represented by the following Expressions 3 and 4.

Expression 1: $CH_4+H_2O \rightarrow CO+3H_2$
Expression 2: $CO+H_2O \rightarrow H_2+CO_2$
Expression 3: $CH_4+1.5\ CO_2 \rightarrow 2C+0.5\ CO+2\ H_2O$
Expression 4: $0.5\ CO+H_2O \rightarrow 0.5H_2+0.5\ CO_2+0.5H_2O$ In the reforming method according to a first specific embodiment of the reforming method according to one embodiment of the present invention, the separating of hydrogen from the second synthetic gas may include: mixing the first synthetic gas with the second synthetic gas to generate a mixed gas, cooling the mixed gas to a predetermined temperature, removing water vapor included in the mixed gas, and separating hydrogen from the mixed gas.

Also, the separating of the second synthetic gas may include: collecting char produced in the second synthetic gas.

In the reforming system implementing the reforming method according to the first embodiment, the reforming unit may have a first reforming unit configured to generate the first synthetic gas, and a second reforming unit configured to generate the second synthetic gas and separated from the first reforming unit.

In addition, the reforming system may further include a mixing unit configured to receive the first synthetic gas from the first reforming unit and receive the second synthetic gas from the second reforming unit and mix the first synthetic gas with the second synthetic gas to generate a mixed gas, and the post-processing unit may receive the mixed gas from the mixing unit, cool the mixed gas to a predetermined temperature, remove water vapor from the mixed gas, and then separate hydrogen from the mixed gas.

Further, the second reforming unit may collect the char generated in the second synthetic gas.

After the separating of hydrogen from the first synthetic gas and before the generating of the second synthetic gas, the reforming method according to a second specific embodiment of the reforming method according to one embodiment of the present invention may further include: allowing the char to react with carbon dioxide in the first synthetic gas from which hydrogen is separated.

Also, the generating of the second synthetic gas may include: allowing steam to react with the carbon monoxide generated during the generating of carbon monoxide to generate hydrogen.

In addition, before the generating of the first synthetic gas, the reforming method may further include: thermally treating waste to generate a pre-treatment gas including char and methane from the waste, wherein the generating of the pre-treatment gas may include: collecting the char generated in the pre-treatment gas.

Further, the generating of the carbon monoxide may include: using the char collected during the generating of the pre-treatment gas.

The reforming system implementing the reforming method according to the second embodiment may further include a reaction unit configured to allow the char to react with carbon dioxide in the first synthetic gas, from which hydrogen is separated, to generate carbon monoxide.

Also, the reforming unit may allow steam to react with the carbon monoxide generated in the reaction unit to generate hydrogen.

In addition, the reforming system may further include a pre-treatment unit configured to thermally treat waste to generate pre-treatment gas, which includes char and methane, from the waste, wherein the pre-treatment unit may collect the char generated in the pre-treatment gas and transfer the char to the reaction unit, and may also transfer the pre-treatment gas to the reforming unit.

Also, elements having the same function within the scope of the inventive concept shown in the drawings of each embodiment will be described using the same reference numerals.

Figure 1:
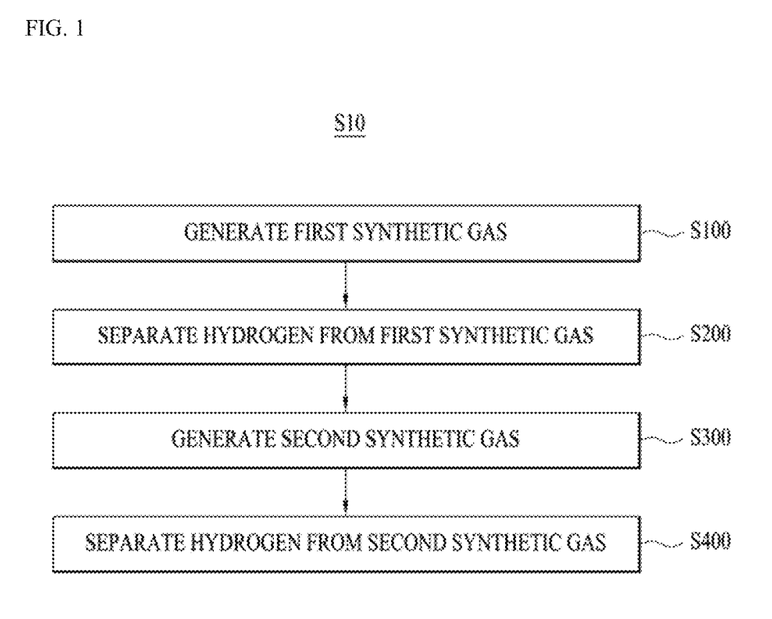
FIG. 1 is a schematic flowchart of a reforming method according to one embodiment of the present invention.

FIG. 1 is a schematic flowchart of a reforming method according to one embodiment of the present invention.

Figure 2:
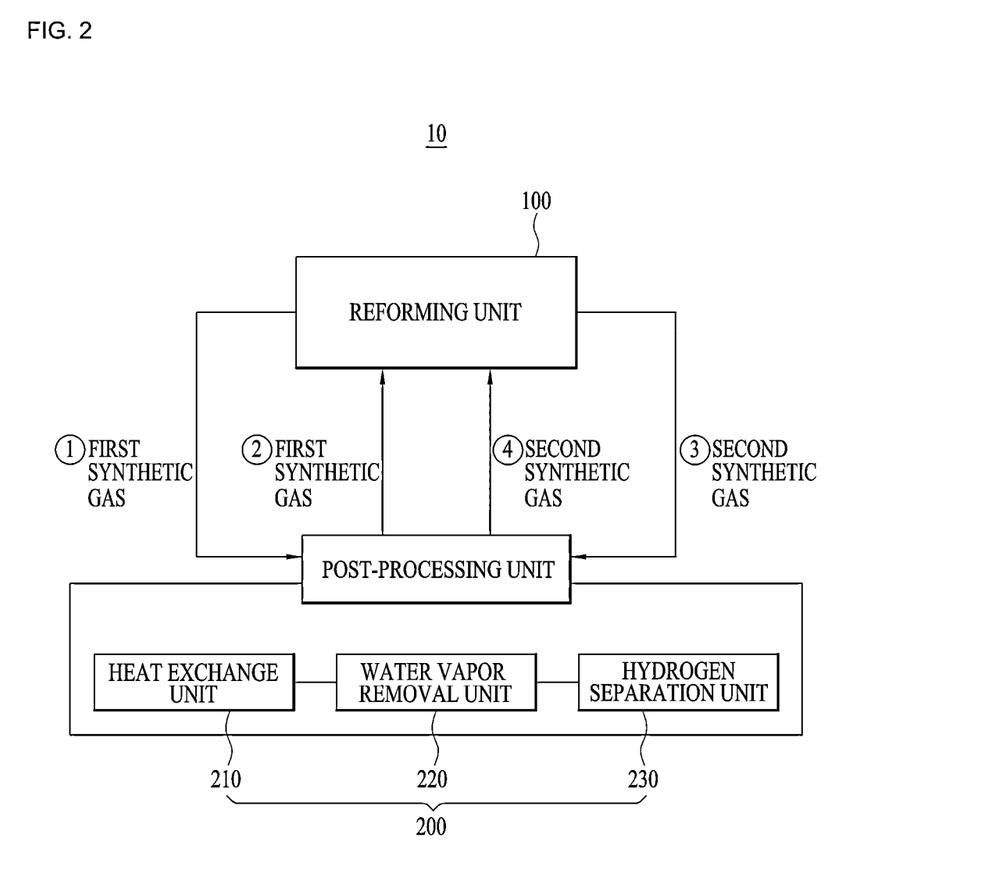
FIG. 2 is a schematic block diagram of a reforming system according to one embodiment of the present invention.

FIG. 2 is a schematic block diagram of a reforming system according to one embodiment of the present invention.

Figure 3:
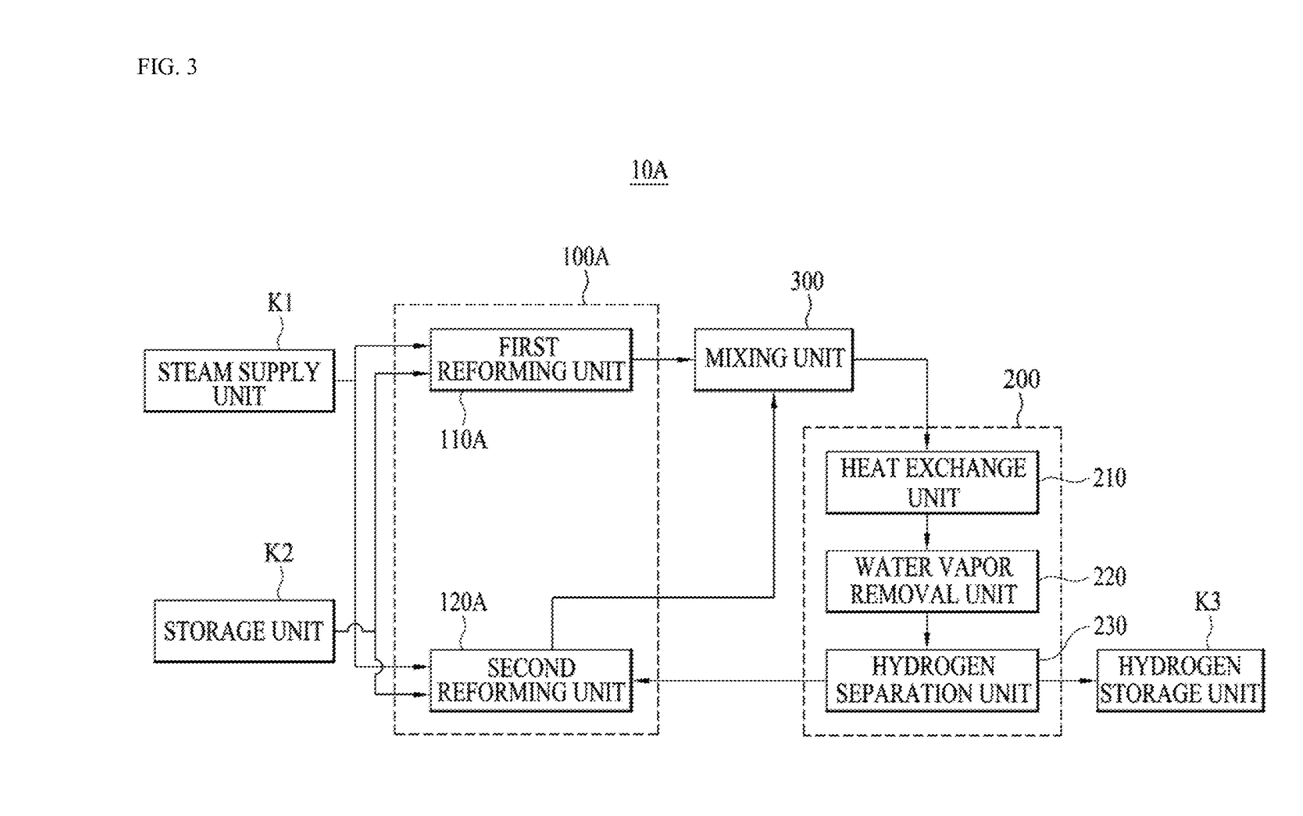
FIG. 3 is a block diagram of a first specific embodiment of the reforming system according to one embodiment of the present invention.

FIG. 3 is a block diagram showing a first specific embodiment of the reforming system according to one embodiment of the present invention.

Figure 4:
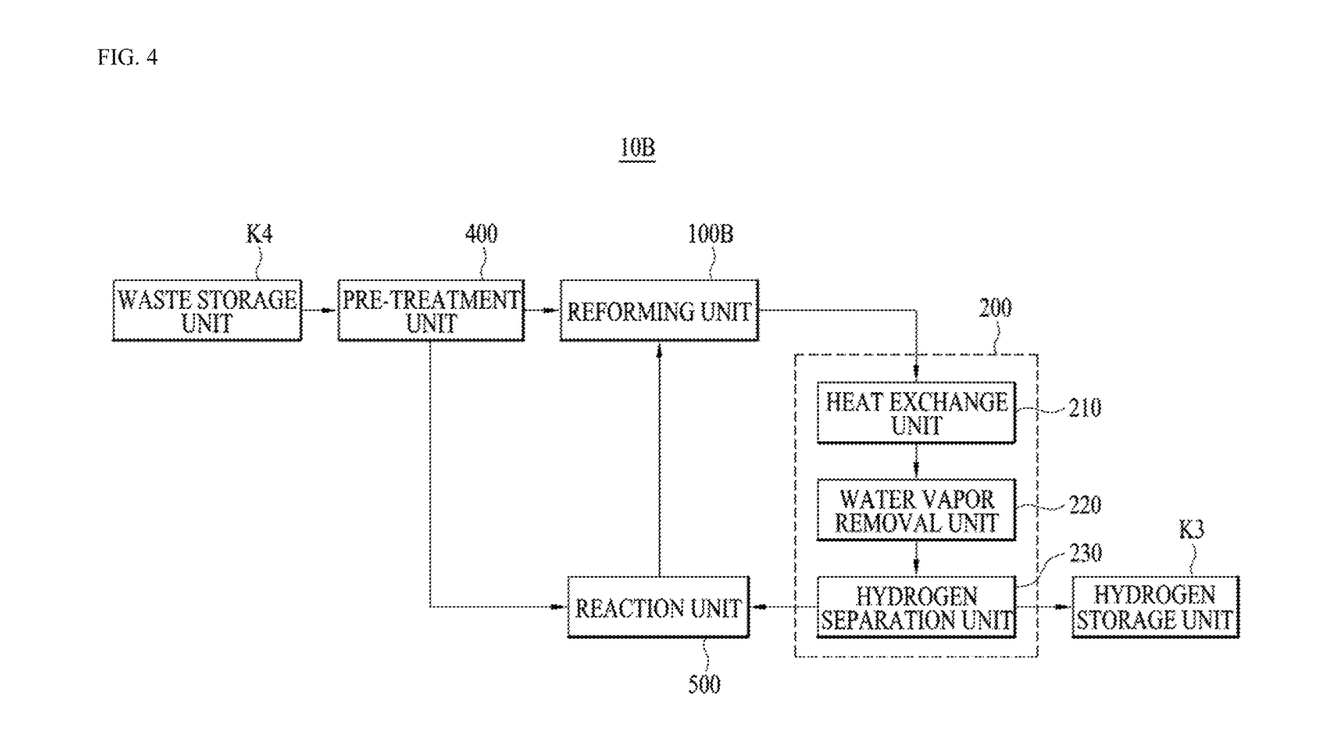
FIG. 4 is a block diagram of a second specific embodiment of the reforming system according to one embodiment of the present invention.

FIG. 4 is a block diagram showing a second specific embodiment of the reforming system according to one embodiment of the present invention.

Figure 5:
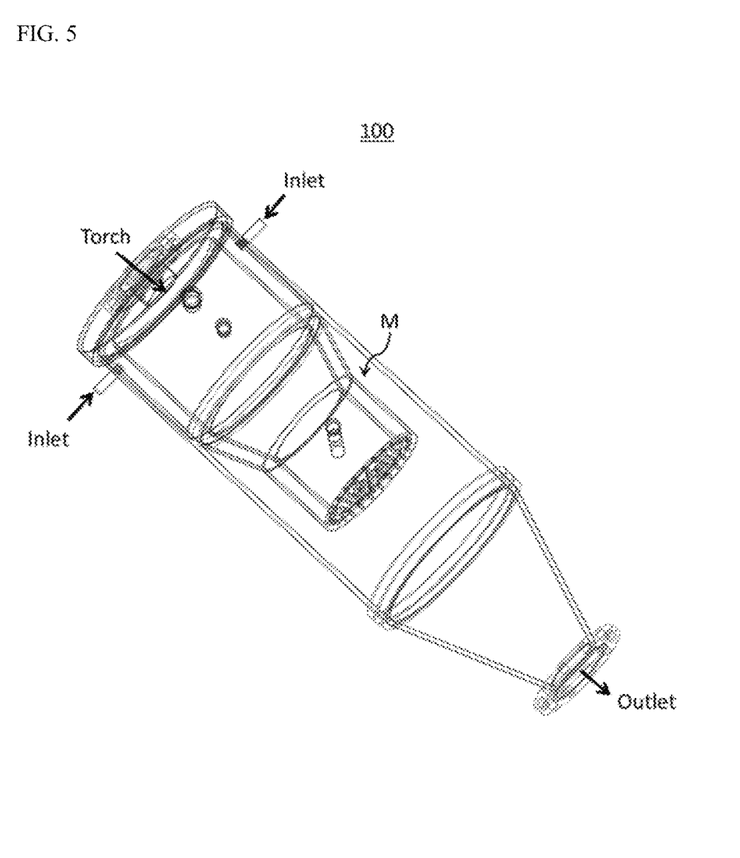
FIG. 5 is a schematic perspective view of a reforming unit of the reforming system according to one embodiment of the present invention.

FIG. 5 is a schematic perspective view of a reforming unit of the reforming system according to one embodiment of the present invention.

In the accompanying drawings, in order to more clearly describe the technical spirit of the present invention, components which are not related to or deviate from the technical spirit of the present invention or may be easily deduced by those skilled in the art are briefly described or omitted.

Throughout the specification, it will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements. Also, when any certain part is said to "include" any component, this means that it may further include other components, rather than excluding other components unless otherwise stated. In this case, it should be understood that the terms "comprises," "comprising," "includes" and/or "including," when used herein, specify the presence of stated features, integers, steps, operations, elements, components and/or groups thereof, but do not preclude the presence or addition of one or more other features, integers, steps, operations, elements, components and/or groups thereof.

Throughout the specification, the term "part" includes units realized by hardware, units realized by software, and units realized using both of the units. Also, one unit may be realized using two or more types of hardware, and two or more units may be realized using one type of hardware.

Hereinafter, a reforming method S10 according to one embodiment of the present invention, and a reforming system 10 implementing the method will be described with reference to FIGS. 1 and 2

As one example, the reforming method S10 may refer to a method of reforming a hydrocarbon to obtain hydrogen.

As one example, the hydrocarbon may include at least any one or a mixed gas of two or more selected from organic compounds composed only of carbon and hydrogen, for example, methane ($CH_4$), LPG, methanol, naphtha, and the like.

However, for the sake of convenience of description, the reforming method will be described on the assumption below that methane ($CH_4$) is reformed to obtain hydrogen.

Methane may also be obtained from natural gas, petroleum gas, and the like, and may be obtained through biomass or waste treatment.

As one example, as shown in FIG. 1, the reforming method S10 may mainly include four steps, as follows.

As one example, the reforming method S10 may include: reforming methane with steam plasma to generate a first synthetic gas, which includes hydrogen and carbon dioxide, from the methane (S100); cooling the first synthetic gas to a predetermined temperature, removing water vapor included in the first synthetic gas, and separating hydrogen from the first synthetic gas (S200); reforming the first synthetic gas, from which hydrogen is separated, and methane with steam plasma to generate hydrogen, and generating a second synthetic gas in which carbon dioxide is decreased (S300); and cooling the second synthetic gas to a predetermined temperature, removing water vapor included in the second synthetic gas, and separating hydrogen from the second synthetic gas (S400).

Hereinafter, the respective steps will be described in detail.

The generating of the first synthetic gas (S100) may refer to a process of reforming methane with steam plasma to generate a first synthetic gas, which includes hydrogen, carbon dioxide, and the like, from the methane.

As one example, the reforming reaction in the generating of the first synthetic gas (S100) may be represented by the following Expressions 1 and 2.

Expression 1:  $CH_4 + H_2O \rightarrow CO + 3H_2$

Expression 2:  $CO + H_2O \rightarrow H_2 + CO_2$

As shown in Expression 1, the methane ($CH_4$) in the generating of the first synthetic gas (S100) may be allowed to react with high-temperature/high-voltage steam ($H_2O$) to generate carbon monoxide (CO) and hydrogen ($3H_2$).

Also, as shown in Expression 2, the carbon monoxide (CO) generated in Expression 1 may be allowed to react with the high-temperature/high-voltage steam ($H_2O$) to generate hydrogen ($H_2$) and carbon dioxide ($CO_2$).

As a result, in the generating of the first synthetic gas (S100), the first synthetic gas generated by reforming methane ($CH_4$) may be a gas including hydrogen ($H_2$), carbon dioxide ($CO_2$), unreacted carbon monoxide (CO), methane, and unreacted water vapor ($H_2O$).

The generating of the first synthetic gas (S100) may be implemented by a reforming unit 100 of the reforming system 10.

More specifically speaking, as shown in FIG. 2, the reforming unit 100 may reform methane with steam plasma to generate a first synthetic gas, which includes hydrogen and carbon dioxide, from the methane.

As one example, the reforming unit 100 may refer to a reaction chamber in which methane is reformed with steam plasma.

For this purpose, the reforming system 10 may further include a steam supply unit (not shown) configured to supply high-temperature/high-voltage steam ($H_2O$) to the reforming unit 100, and the reforming unit 100 may have a plasma generation unit (not shown) configured to generate plasma.

As a result, the reforming reactions of Expressions 1 and 2 may occur in the reforming unit 100.

Meanwhile, in the reforming method S10, the separating of hydrogen from the first synthetic gas (S200) may include: cooling the first synthetic gas to a predetermined temperature, removing water vapor included in the first synthetic gas, and separating hydrogen from the first synthetic gas.

The separating of hydrogen from the first synthetic gas (S200) may be implemented by a post-processing unit 200 of the reforming system 10.

More specifically speaking, as shown in FIG. 2, the post-processing unit 200 may have a heat exchange unit 210 configured to cool the first synthetic gas to a predetermined temperature, a water vapor removal unit 220 configured to remove water vapor included in the first synthetic gas, and a hydrogen separation unit 230 configured to separate hydrogen from the first synthetic gas.

As a result, the post-processing unit 200 may receive the first synthetic gas from the reforming unit 100, cool the first synthetic gas to a predetermined temperature by means of the heat exchange unit 210, remove water vapor included in the first synthetic gas by means of the water vapor removal unit 220, and then separate hydrogen from the first synthetic gas by means of the hydrogen separation unit 230.

The hydrogen separated in the hydrogen separation unit 230 may be stored in a separate hydrogen storage unit (not shown).

As one example, the heat exchange unit 210 may cool the first synthetic gas to a preset temperature by means of a heat exchange medium.

Any one of known heat exchange devices may be selected and disposed as the heat exchange unit 210.

As one example, the water vapor removal unit 220 may be a demister, but the present invention is not limited thereto. In this case, the water vapor removal unit 220 is widely applicable by those skilled in the art as long as it is configured to remove water vapor.

As one example, the hydrogen separation unit 230 is configured to separate hydrogen from the first synthetic gas. In this case, this configuration may be implemented by one of pressure swing absorption (PSA), temperature swing adsorption (TSA), and membrane methods. Preferably, the configuration may be implemented by a PSA method.

Meanwhile, the generating of the second synthetic gas (S300) in the reforming method S10 may include: reforming the first synthetic gas, from which hydrogen is separated in the separating of hydrogen from the first synthetic gas (S200), and methane with steam plasma to generate hydrogen, and generating the second synthetic gas in which carbon dioxide is decreased.

The generating of the second synthetic gas (S300) may refer to a process of recycling the first synthetic gas to re-generate hydrogen by means of the first synthetic gas, and also decreasing carbon dioxide included in the first synthetic gas.

As one example, the reforming reaction in the generating of the second synthetic gas (S300) may be represented by the following Expressions 3 and 4.

Expression 3: $CH_4 + 1.5\ CO_2 \rightarrow 2C + 0.5\ CO + 2\ H_2O$

Expression 4: $0.5\ CO + H_2O \rightarrow 0.5H_2 + 0.5\ CO_2 + 0.5H_2O$

As shown in Expression 3, the carbon dioxide ($CO_2$) included in the first synthetic gas may be allowed to react with methane ($CH_4$) under a high-temperature/high-voltage environment to generate carbon monoxide (CO), water vapor ($H_2O$), and char (i.e., carbon)

Also, as shown in Expression 4, the carbon monoxide (CO) included in the first synthetic gas or generated by Expression 3 may be allowed to react with high-temperature/high-voltage steam ($H_2O$) to generate hydrogen ($H_2$), carbon dioxide ($CO_2$), and water vapor ($H_2O$).

Generally referring to Expressions 3 and 4, it can be seen that the first synthetic gas may be recycled to further generate hydrogen ($H_2$) and simultaneously decrease the carbon dioxide ($CO_2$) included in the first synthetic gas during the generating of the second synthetic gas (S300), as shown in Expressions 3 and 4.

Therefore, the reforming method S10 is effective in increasing a yield of hydrogen and simultaneously reducing an emission amount of carbon dioxide.

Meanwhile, the second synthetic gas generated during the generating of the second synthetic gas (S300) may be a gas including hydrogen ($H_2$), carbon dioxide ($CO_2$), char, unreacted carbon monoxide (CO), and unreacted water vapor ($H_2O$).

The generating of the second synthetic gas (S300) may be implemented by the reforming unit 100 of the reforming system 10.

More specifically speaking, as shown in FIG. 2, the reforming unit 100 may receive the first synthetic gas, from which hydrogen is separated, from the post-processing unit 200 and reform the first synthetic gas and methane with steam plasma to generate hydrogen, and may also generate the second synthetic gas in which carbon dioxide is decreased.

As a result, the reforming reaction of Expressions 3 and 4 may occur in the reforming unit 100.

Meanwhile, the separating of hydrogen from the second synthetic gas (S400) in the reforming method S10 may include: cooling the second synthetic gas to a predetermined temperature, removing water vapor included in the second synthetic gas, and separating hydrogen from the second synthetic gas.

The separating of hydrogen from the second synthetic gas (S400) may be implemented by the post-processing unit 200 of the reforming system 10.

More specifically speaking, as shown in FIG. 2, the post-processing unit 200 may receive the second synthetic gas from the reforming unit 100, cool the second synthetic gas to a predetermined temperature by means of the heat exchange unit 210, remove water vapor included in the second synthetic gas by means of the water vapor removal unit 220, and then separate hydrogen from the second synthetic gas by means of the hydrogen separation unit 230.

The hydrogen separated in the hydrogen separation unit 230 may be stored in a separate hydrogen storage unit (not shown).

Hereinafter, the reforming method S10 and the first and second specific embodiments of the reforming method S10 as described above will be described in further detail.

Meanwhile, the contents which are not related to or deviate from technical spirit of the present invention as described above or may be easily deduced by those skilled in the art are briefly described or omitted.

1. Reforming Method and Reforming System 10A According to First Embodiment

FIG. 3 is a schematic block diagram of a reforming system 10A according to a first embodiment.

As one example, as shown in FIG. 3, the reforming unit 100A may have a first reforming unit 110A configured to generate the first synthetic gas, and a second reforming unit 120A configured to generate the second synthetic gas and separated from the first reforming unit 110A.

That is, the first reforming unit 110A and the second reforming unit 120A may be independent chambers separated from each other.

Here, as one example, the generating of the first synthetic gas (S100) may be implemented in the first reforming unit 110A.

The reforming system 10A according to first embodiment may further include a storage unit K2 configured to store methane and supply methane to the first reforming unit 110A, and a steam supply unit K1 configured to supply high-temperature/high-voltage steam to the first reforming unit 110A.

That is, the first reforming unit 110A may reform methane with steam plasma to generate the first synthetic gas, which includes hydrogen and carbon dioxide from the methane.

As a result, the reforming reaction in the first reforming unit 110A may be a reaction of Expression 1 or 2.

Next, the separating of hydrogen from the first synthetic gas (S200) may be implemented in the post-processing unit 200.

As shown in FIG. 3, the post-processing unit 200 may receive the first synthetic gas from the first reforming unit 110A, cool the first synthetic gas to a predetermined temperature by means of the heat exchange unit 210, remove water vapor included in the first synthetic gas by means of the water vapor removal unit 220, and then separate hydrogen from the first synthetic gas by means of the hydrogen separation unit 230.

The hydrogen separated in the hydrogen separation unit 230 may be stored in a hydrogen storage unit K3.

Then, the generating of the second synthetic gas (S300) may be implemented in the second reforming unit 120A.

The second reforming unit 120A may receive the first synthetic gas, from which hydrogen is separated, from the post-processing unit 200, and may also receive high-temperature/high-voltage steam and methane from the steam supply unit K1 and the storage unit K2, respectively.

That is, the second reforming unit 120A may reform the first synthetic gas, from which hydrogen is separated, and methane with steam plasma to generate hydrogen, and may generate a second synthetic gas in which carbon dioxide is decreased.

As a result, the reforming reaction in the second reforming unit 120A may be a reaction of Expression 3 or 4.

Here, the generating of the second synthetic gas (S300) may include: collecting char generated in the second synthetic gas.

That is, the second reforming unit 120A may have a collection unit (not shown) configured to collect char generated in the second synthetic gas.

As one example, the collection unit may be a collection device (such as a filter or the like) installed at the second reforming unit 120A to supply the steam and/or the char included in the second synthetic gas to the second reforming unit 120A.

The char collected in the collection unit may be recycled in various fields such as lightweight aggregates, soil conditioners, and the like.

Then, the separating of hydrogen from the second synthetic gas (S400) may be implemented by the post-processing unit 200.

As shown in FIG. 3, the post-treatment unit 200 may receive the second synthetic gas from the second reforming unit 120A, cool the second synthetic gas to a predetermined temperature by means of the heat exchange unit 210, remove water vapor included in the second synthetic gas by means of the water vapor removal unit 220, and then separate hydrogen from the second synthetic gas by means of the hydrogen separation unit 230.

The hydrogen separated in the hydrogen separation unit 230 may be stored in the hydrogen storage unit K3.

Meanwhile, in the reforming method S10 according to the first embodiment, the separating of hydrogen from the second synthetic gas (S400) may include: mixing the first synthetic gas with the second synthetic gas to generate a mixed gas, cooling the mixed gas to a predetermined temperature, removing water vapor included in the mixed gas, and separating hydrogen from the mixed gas.

For this purpose, as shown in FIG. 3, the reforming system 10A according to the first embodiment may further include a mixing unit 200 configured to receive the first synthetic gas from the first reforming unit 110A and receive the second synthetic gas from the second reforming unit 120A and mix the first synthetic gas with the second synthetic gas to generate a mixed gas.

That is, the second synthetic gas generated in the second reforming unit 120A may be transferred to the mixing unit 300, and the first synthetic gas generated in the first reforming unit 110A may also be transferred to the mixing unit 300 to generate the mixed gas in which the first synthetic gas and the second synthetic gas are mixed.

As the mixed gas generated in the mixing unit 300 is transferred from the mixing unit 300 and sequentially passes through the heat exchange unit 210, the water vapor removal unit 220, and the hydrogen separation unit 230, the post-processing unit 200 may receive the mixed gas from the mixing unit 300, cool the mixed gas to a predetermined temperature, remove water vapor included in the mixed gas, and then separate hydrogen from the mixed gas.

Therefore, only one post-processing unit 200 may be used to efficiently post-process the first synthetic gas, the second synthetic gas, and the mixed gas.

Next, the mixed gas post-processed by the post-processing unit 200 may be introduced into the second reforming unit 120A again.

As a result, the yield efficiency of hydrogen may be maximized, and the emission amount of carbon dioxide may be reduced.

Meanwhile, the mixing unit 300 may have a first valve (not shown) configured to control the introduction of the first synthetic gas generated in the first reforming unit 110A, and a second valve (not shown) configured to control the introduction of the second synthetic gas generated in the second reforming unit 120A.

Therefore, the mixing unit 300 may optionally transfer the first synthetic gas and/or the second synthetic gas to the heat exchange unit 210.

More specifically speaking, the mixing unit 300 may receive only the first synthetic gas from the first reforming unit 110A and transfer the first synthetic gas to the heat exchange unit 210 by opening the first valve and closing the second valve, or may receive only the second synthetic gas from the second reforming unit 120A and transfer the second synthetic gas to the heat exchange unit 210 by closing the first valve and opening the second valve, or may also receive the first synthetic gas and the second synthetic gas from the first reforming unit 110A and the second reforming unit 120A and transfer the resulting mixed gas to the heat exchange unit 210 by opening both the first valve and the second valve.

2. Reforming Method and Reforming System 10B According to Second Embodiment

FIG. 4 is a schematic block diagram of a reforming system 10B according to a second embodiment.

As one example, as shown in FIG. 4, the reforming system 10B according to the second embodiment may include pre-treatment unit 400 configured to thermally treat waste to generate a pre-treatment gas, which includes char and methane, from the waste.

That is, before the generating of the first synthetic gas (S100), the reforming method S10 according to the second embodiment may further include: thermally treating waste by means of the pre-treatment unit 400 to generate a pre-treatment gas, which includes char and methane, from the waste.

The waste may be household waste, but the type of waste is not limited thereto. In this case, any type of waste may be used as long as it may be pyrolyzed by the pre-treatment unit 400 to generate a pre-treatment gas including char and methane.

The pre-treatment unit 400 may be configured to burn the waste under a high-temperature/high-voltage environment to generate the pre-treatment gas.

Also, the pre-treatment unit 400 may collect the char generated in the pre-treatment gas.

Here, the reforming system 10B according to the second embodiment may further include a waste storage unit K4 configured to store waste and transfer the waste to the pre-treatment unit 400.

Meanwhile, the generating of the first synthetic gas (S100) may be implemented in the reforming unit 100B.

The reforming unit 100B may receive the pre-treatment gas including methane from the pre-treatment unit 400, and reform the methane included in the pre-treatment gas with steam plasma to generate the first synthetic gas, which includes hydrogen and carbon dioxide, from the methane.

The reforming system 10B according to the second embodiment may further include a steam supply unit (not shown) configured to supply high-temperature/high-voltage steam to the reforming unit 100B.

As a result, the reforming reaction in the reforming unit 100B may be a reaction of Expression 1 or 2.

Next, the separating of hydrogen from the first synthetic gas (S200) may be implemented by the post-processing unit 200.

As shown in FIG. 4, the post-processing unit 200 may receive the first synthetic gas from the reforming unit 100B, cool the first synthetic gas to a predetermined temperature by means of the heat exchange unit 210, remove water vapor included in the first synthetic gas by means of the water vapor removal unit 220, and then separate hydrogen from the first synthetic gas by means of the hydrogen separation unit 230.

The hydrogen separated in the hydrogen separation unit 230 may be stored in the hydrogen storage unit K3.

In the reforming method S10 according to the second embodiment, the generating of the second synthetic gas (S300) may also be implemented in the reforming unit 100B.

The reforming unit 100B may receive the first synthetic gas, from which hydrogen is separated, from the post-processing unit 200, and may also receive high-temperature/high-voltage steam and methane from the steam supply unit K1 and the pre-treatment unit 400, respectively.

That is, the reforming unit 100B may reform the first synthetic gas, from which hydrogen is separated, and methane with steam plasma to generate hydrogen, and may generate a second synthetic gas in which carbon dioxide is decreased.

As a result, the reforming reaction in the reforming unit 100B may be a reaction of Expression 3 and 4.

Here, the generating of the second synthetic gas (S300) may include: collecting the char generated in the second synthetic gas.

That is, the reforming unit 100B may have a collection unit (not shown) configured to collect the char generated in the second synthetic gas.

Next, in the reforming method S10 according to the second embodiment, the separating of hydrogen from the second synthetic gas (S400) may be implemented by the post-processing unit 200.

As shown in FIG. 4, the post-processing unit 200 may receive the second synthetic gas from the reforming unit 100B, cool the second synthetic gas to a predetermined temperature by means of the heat exchange unit 210, remove water vapor included in the second synthetic gas by means of the water vapor removal unit 220, and then separate hydrogen from the second synthetic gas by means of the hydrogen separation unit 230.

The hydrogen separated in the hydrogen separation unit 230 may be stored in the hydrogen storage unit K3.

Meanwhile, after the separating of hydrogen from the first synthetic gas (S200) and before the generating of the second synthetic gas (S300), the reforming method S10 according to the second embodiment may further include: allowing the char to react with carbon dioxide in the first synthetic gas, from which hydrogen is separated, to generate carbon monoxide.

To implement the generation of the carbon monoxide, as shown in FIG. 4, the reforming system 10B according to the second embodiment may further include a reaction unit 500 configured to allow char to react with carbon dioxide in the first synthetic gas, from which hydrogen is separated, to generate carbon monoxide.

The reaction unit 500 may receive the first synthetic gas, from which hydrogen is separated, from the post-processing unit 200 during the separating of hydrogen from the first synthetic gas (S200), receive the char, which is collected during the generating of the pre-treatment gas, from the pre-treatment unit 400, and allow the char to react with carbon dioxide included in the first synthetic gas under a high-temperature/high-voltage environment to generate carbon monoxide.

A reaction scheme in the reaction unit 500 is represented by the following Expression 5.

Expression 5: $C + CO_2 \rightarrow 2CO$

That is, sequentially looking at the reforming method S10 according to the second embodiment, the generating of the pre-treatment gas may be implemented in the pre-treatment unit 400, and the generating of the first synthetic gas (S100) may then be implemented in the reforming unit 100B. Then, the separating of hydrogen from the first synthetic gas (S200) may be implemented in the post-processing unit 200, and the generating of the carbon monoxide may then be implemented in the reaction unit 500. Then, the generating of the second synthetic gas (S300) may be implemented in the reforming unit 100B.

Here, the generating of the second synthetic gas (S300) may include: allowing steam to react with the carbon monoxide generated during the generating of the carbon monoxide to generate hydrogen.

More specifically speaking, the carbon monoxide generated in the reaction unit 500 may be transferred to the reforming unit 100B in a state in which the carbon monoxide is included in the first synthetic gas. In this case, the reforming unit 100B may allow steam to react with the carbon monoxide, which is generated by the reaction unit 500 during the generating of the second synthetic gas (S300), to generate hydrogen and carbon dioxide.

A reaction scheme for such a reaction is represented by the following Expression 6.

Expression 6: $2CO + 2H_2O \rightarrow 2H_2 + 2CO_2$

That is, in the reforming method S10 according to the second embodiment, carbon monoxide may be generated in the reaction unit 500, and a larger amount of hydrogen may be generated by allowing the generated carbon monoxide to react with water vapor in the reforming unit 100B.

Also, the carbon dioxide generated in Expression 6 may be decreased in the reforming unit 100B through the reactions of Expressions 3 and 4.

As a result, a yield of hydrogen may be enhanced, and an emission amount of carbon dioxide may be reduced.

Meanwhile, FIG. 5 is a schematic perspective view of the reforming unit 100 of the reforming system. As shown in FIG. 5, a high-temperature plasma torch may be introduced in the reforming unit 100, and the hydrocarbon, water vapor, and the like as described above may be introduced through a plurality of inlets.

Meanwhile, the reforming unit 100 may include a catalyst module M configured to generate hydrogen in an inner space thereof.

The catalyst module M may be composed of a cage forming a space in which a predetermined catalyst is stored, and a catalyst stored in the cage.

As one example, the cage may be composed of inner and outer walls, and the catalyst may be disposed between the inner and outer walls.

As one example, the catalyst may be a nickel (Ni)-based catalyst that may generate hydrogen from a hydrocarbon under a high-temperature environment (for example, 400° C. or higher). For example, the catalyst may be Ni/alpha-Al₂O₃, Ni/SiO₂, Ni—Zn—Al, or the like, but the present invention is not limited thereto.

Meanwhile, the catalyst module M may be disposed in a casing of the reforming unit 100, and heated (for example, 400° C. or higher) by waste heat of the plasma torch configured to reform a hydrocarbon to generate hydrogen.

As a result, the hydrocarbon introduced into the reforming unit 100 may be primarily reformed with high-temperature/high-voltage steam plasma, and secondarily reformed in the catalyst module M to generate a large amount of hydrogen at relatively low power, and may be allowed to move toward the post-processing unit 200 through an outlet.

The reforming system according to one embodiment of the present invention has an advantage in that the reforming system can be effective in increasing a yield of hydrogen and simultaneously reducing an emission amount of carbon dioxide.

The effects of the present invention are not limited to the above-described effects, and other effects that are not mentioned herein will be clearly understood from the present specification and the accompanying drawings by those of ordinary skill in the art to which the present invention pertains.

Although the configuration and features of the present invention have been described with reference to embodiments of the present invention as described above, the present invention is not limited thereto, and it will be apparent to those skilled in the art to which the present invention pertains that various changes and modifications can be made to the above-described exemplary embodiments of the present invention without departing from the spirit or scope of the invention. Thus, it is intended that the present invention covers all such modifications provided they fall within the scope of the appended claims and their equivalents.

What is claimed is:

1. A reforming method of reforming a hydrocarbon to obtain hydrogen, comprising:
   reforming a hydrocarbon with steam plasma to generate a first synthetic gas, which comprises hydrogen and carbon dioxide, from the hydrocarbon;
   cooling the first synthetic gas to a predetermined temperature, removing water vapor included in the first synthetic gas, and separating hydrogen from the first synthetic gas;
   reforming the first synthetic gas, from which hydrogen is separated, and a hydrocarbon with steam plasma to generate hydrogen, and generating a second synthetic gas in which carbon dioxide is decreased; and
   cooling the second synthetic gas to a predetermined temperature, removing water vapor included in the second synthetic gas, and separating hydrogen from the second synthetic gas.

2. The reforming method of claim 1, further comprising, after the separating of hydrogen from the first synthetic gas and before the generating of the second synthetic gas:
   generating of the carbon monoxide by reacting char and carbon dioxide in the first synthesis gas from which hydrogen is separated.

3. The reforming method of claim 2, wherein the generating of the second synthetic gas comprises:
   allowing steam to react with carbon monoxide generated during the generating of the carbon monoxide to generate hydrogen.

4. The reforming method of claim 3, further comprising, before the generating of the first synthetic gas:
   thermally treating waste to generate a pre-treatment gas comprising char and a hydrocarbon from the waste,
   wherein the generating of the pre-treatment gas comprises:
   collecting the char generated in the pre-treatment gas.

5. The reforming method of claim 4, wherein the generating of the carbon monoxide comprises:
   using the char collected during the generating of the pre-treatment gas.

6. The reforming method of claim 1, wherein the separating of hydrogen from the second synthetic gas comprises:
   mixing the first synthetic gas with the second synthetic gas to generate a mixed gas,
   cooling the mixed gas to a predetermined temperature, removing water vapor included in the mixed gas, and separating hydrogen from the mixed gas.

7. The reforming method of claim 6, wherein generating of the second synthetic gas comprises:
   collecting char generated in the second synthetic gas.

* * * * *